United States Patent Office 3,083,666
Patented Apr. 2, 1963

3,083,666
PROJECTILE AIMING SYSTEM
George Agins, Brooklyn, N.Y., assignor to American Bosch Arma Corporation
Filed Jan. 7, 1947, Ser. No. 720,521
14 Claims. (Cl. 114—23)

This invention relates to projectile aiming systems, and has particular reference to an accurate system for calculating aiming data for submarine torpedoes, although the invention is not limited to that use.

In firing of submarine torpedoes at target vessels which move during the time of flight of the torpedo, it has been the practice to measure the range by means of the periscope or by sound wave reflections, and then to calculate the deflection angle for the torpedo. Obtaining range by sound means may often divulge the position of the observer's own ship, and optical methods of obtaining range with only the small base line available have not been accurate. Heretofore, accurate range has been regarded as an essential input to proper torpedo aiming calculations, even though the inherent limitations on obtaining range measurements on a submarine or other torpedo-discharging craft precluded accurate range measurements, so that any system that produces accurate torpedo aiming measurements without absolute reliance on accuracy of range would solve a problem heretofore regarded as insoluble.

In accordance with the present invention, an accurate torpedo-aiming system is provided, in which the importance of range is minimized, the only information required being the relative co-target angle, i.e., the angle between the line of sight and the minimum range line to the relative movement line, and the angular rate of change of that angle, whereby aiming calculations are produced on which torpedo steering operations are based causing the torpedo to follow a curved course into proximity to the target.

In a preferred embodiment of the torpedo-aiming system of the present invention, means are provided on the torpedo-discharging ship cooperating with means on the torpedo for transferring from the ship to the torpedo, up to the instant of discharge of the torpedo, all known information about the proposed shot, including fictitious range, which is selected to be definitely less than the approximate range, in lieu of present range, calculating apparatus in the torpedo for continuously integrating such information to obtain data for guiding itself on a curved path bringing it into proximity to the target, and control mechanism in the torpedo responsive to said calculating apparatus for actuating the directional controls of the torpedo to cause the same to pass through every point of impact to which the target may have moved while the torpedo was traveling thereto.

Figure 1:
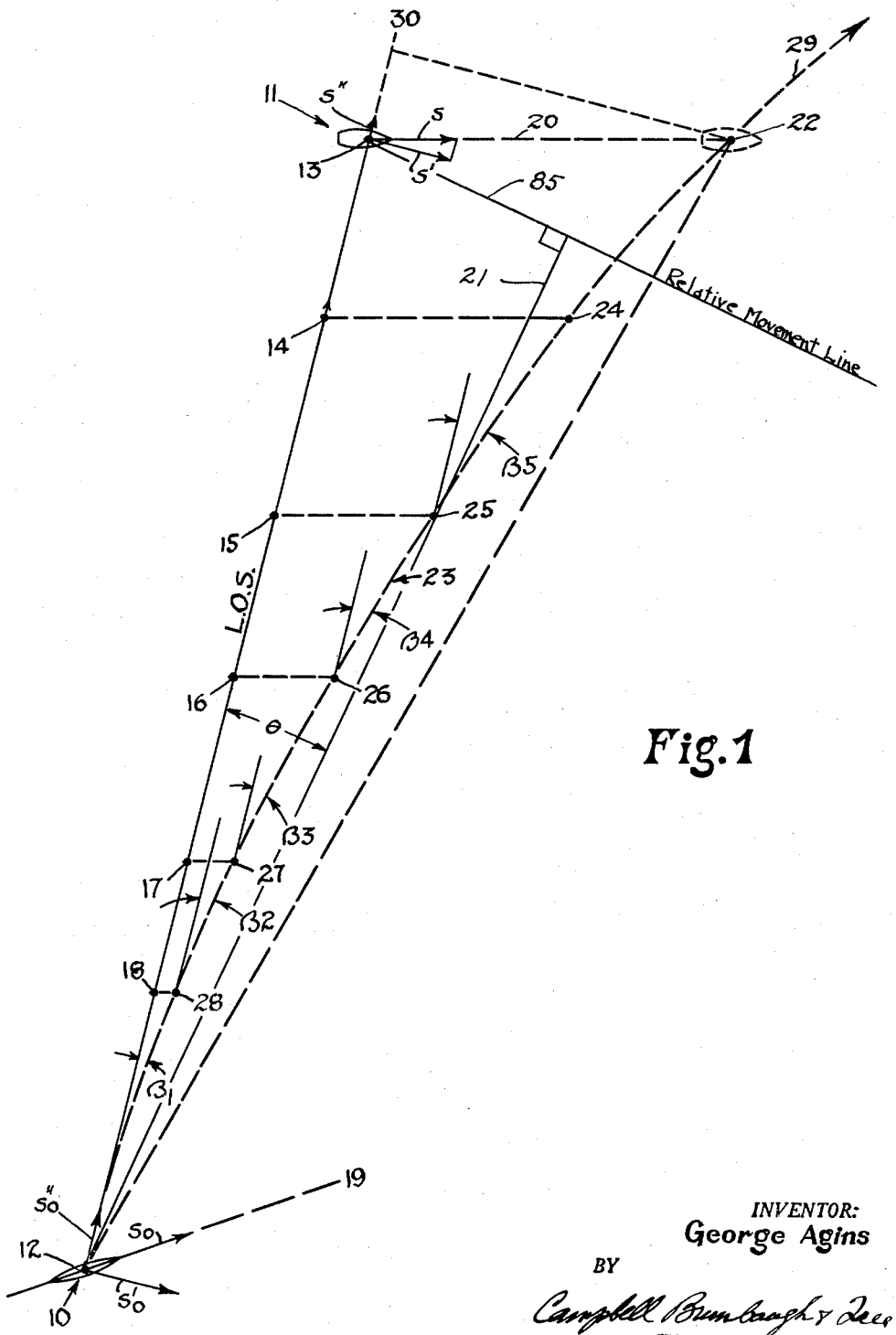
Figure 2:
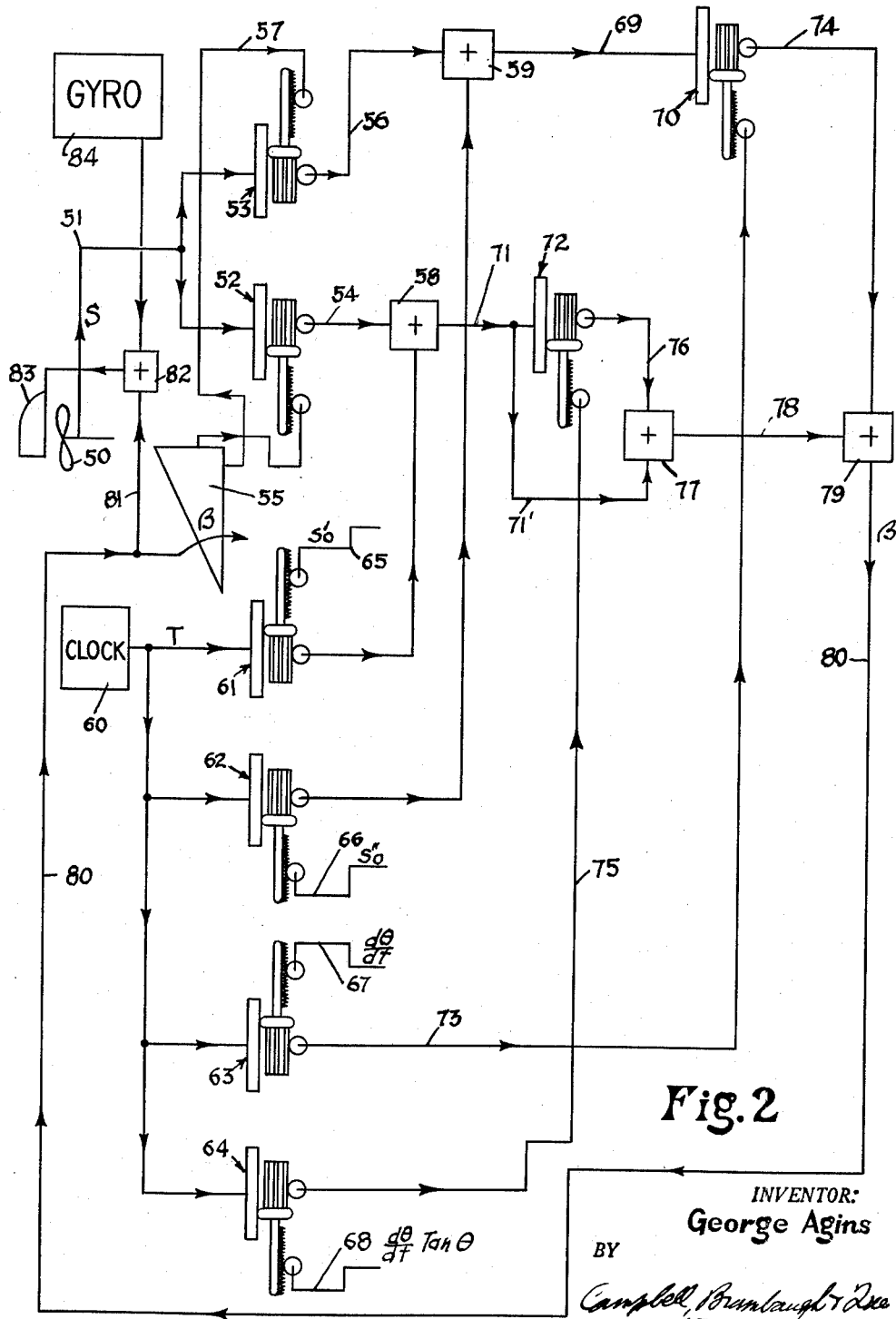

For a more complete understanding of the invention, reference may be had to the accompanying drawings, in which:

FIGURE 1 is a diagram of the torpedo problem and explanatory of its solution according to the present invention; and FIG. 2 is a schematic diagram of the mechanism of this invention.

Referring to FIG. 1, numeral 10 designates own ship having torpedo-discharging mechanism at 12, and sailing along line 19 at a rate of speed indicated by the vector $s_0$, having one component $s''_0$ resolved along the line of sight LOS from the periscope or director at 12 to point 13 on the target ship 11, and a second component $s'_0$ at right angles thereto, as shown. The target ship 11 is sailing along the course 20, and a line 21 from own ship 10 perpendicular to relative movement line 85 of target ship 11 represents minimum range, and the angle $\theta$ between the line of sight LOS and line 21 is the relative co-target angle. Since the target ship 11 is moving along its course 20 toward point 22, relative co-target angle $\theta$ is measurably changing, and hence the angular rate of change of the relative co-target angle $\theta$ is $$\frac{d\theta}{dt}$$

As disclosed in application Serial No. 446,886, filed June 13, 1942, by applicant and others, the value of the relative co-target angle $\theta$ is determined by its rate of change $$\frac{d\theta}{dt}$$

and by its acceleration rate $$\frac{d^2\theta}{dt^2}$$

and, since both of these rates can be continuously measured, the control officer on the attacking ship 12 knows accurately the value of relative co-target angle $\theta$ at every instant and can furnish its value and its rate and acceleration to a torpedo about to be launched. Accordingly, the known or ascertainable factors are the relative co-target angle $\theta$ between the line of sight LOS and the minimum range line 21; the component $s''_0$ of the speed of own ship 10 in the line of sight LOS; the component $s'_0$ of the speed of own ship 10 perpendicular to the line of sight LOS and the angular rate of change $$\frac{d\theta}{dt}$$

of the relative co-target angle $\theta$.

The unknown factors include the speed of the target ship 11 along its course 20, this speed being represented by the vector $s$, having one component, $s''$ in the line of sight LOS and another component, $s'$, perpendicular thereto. Also unknown is the present range X, but which is represented in FIG. 1 by the distance 10—18—17—16—15—14—13, of which several estimated ranges are shown greatly exaggerated for clarity, one being the distance 10—14, another the distance 10—15, a third the distance 10—16, a fourth the distance 10—17, and finally the very short range 10—18. The remaining unknown factors are T, the time of the torpedo run, and S, the distance of the torpedo run.

The target, 11, actually being at the point 13 and sailing at the rate shown, will arrive at the point 22 at the same instant as a torpedo launched from own ship 10 at point 12 at the instant when LOS is the line of sight and the present range. In previous technique, the torpedo would travel along the straight line 10—22, but according to this invention, it will be controlled to travel along a curve of very special form illustrated at 23 in FIG. 1 and passing through the same end point 22. This curve 23 is, in effect, mathematically the locus of all impact points of the torpedo and the target 11 for all possible ranges from zero to maximum, when the value of the relative co-target angle is $\theta$, and its angular rate of change is $$\frac{d\theta}{dt}$$

Considering the geometry of the problem according to FIG. 1, $$S_x = X + s''T \tag{1}$$

which is the component of future target position with respect to the firing point along the line of sight $$S_y = s'T \tag{2}$$

which is the component of future target position with respect to the firing point, perpendicular to the line of sight By mathematics:

$$s'' = X\frac{d\theta}{dt} \tan \theta - s''_o \quad (3)$$

and $$s' = X\frac{d\theta}{dt} - s'_o \quad (4)$$

Substituting in (1) and (2)

$$S_x = X + X\frac{d\theta}{dt}(\tan \theta)T - s''_o T \quad (5)$$

$$S_y = X\frac{d\theta}{dt}T - s'_o T \quad (6)$$

Solving (5) for X $$X = \frac{S_x + s''_o T}{1 + \frac{d\theta}{dt}(\tan \theta)T} \quad (7)$$

After launching, the torpedo steers itself around in the direction of target travel by an angle $\beta$ which changes with S.
Therefore $$S_X = \int_0^S \cos \beta \, dS \quad (8)$$

and $$S_y = \int_0^S \sin \beta \, dS \quad (9)$$

Substituting for $S_x$ in (7)

$$X = \frac{\int_0^S \cos \beta \, dS + s''_o T}{1 + \frac{d\theta}{dt}(\tan \theta)T} \quad (10)$$

Substituting value of X in (10) in (6), $$S_y = \left[\frac{\int_0^S \cos \beta \, dS + s''_o T}{1 + \frac{d\theta}{dt}(\tan \theta)T}\right]\frac{d\theta}{dt}T - s'_o T \quad (11)$$

But according to (9) above $$S_y = \int_0^S \sin \beta \, dS$$

Therefore $$\frac{d\theta}{dt}T\left[\int_0^S \cos \beta \, dS + s''_o T\right]$$
$$= \left[1 + \frac{d\theta}{dt}(\tan \theta)T\right]\left[\int_0^S \sin \beta \, dS + s'_o T\right] \quad (12)$$

and since $T = KS$, K being the instrument constant $$\frac{d\theta}{dt}KS\left[\int_0^S \cos \beta \, dS + s''_o KS\right]$$
$$= \left[1 + \frac{d\theta}{dt}(\tan \theta)KS\right]\left[\int_0^S \sin \beta \, dS + s'_o KS\right] \quad (13)$$

If either the equality of (12) or (13) is maintained in the travelling torpedo by manipulating the angle $\beta$ and the rudder is adjusted thereby, the torpedo has a very good chance of meeting the target at whatever range it may be found.

Calculating mechanism is provided in the torpedo for integrating these values from the determined data fed to it before the torpedo is launched, and for determining the position of the torpedo, so that it may steer itself along the curved path 23, thus finding the target 11, wherever it may happen to be, the angle $\beta$ changing accordingly. For instance, if the target 11 is actually at the point 14 instead of at the assumed point 13, the torpedo path is finally turned through angle $\beta_5$ and the impact of the torpedo with the target ship 11 will be had at point 24. Or, if the target 11 is actually at point 15, the path angle is $\beta_4$ and impact will occur at point 25. If the target 11 is at 16, the path angle is $\beta_3$ and impact will occur at 26; if the target 11 is at 17, the path angle is $\beta_2$ and impact will occur at 27, and finally, if the target is at 18, the path angle is the initial angle $\beta_1$ and impact will occur at 28. And, correspondingly, should the target 11 actually be located beyond point 13, the torpedo would find it, if not spent, somewhere on the similarly-curved prolongation 29 of the curve 23.

A preferred form of this calculating mechanism in the torpedo is shown diagrammatically by FIG. 2, and includes mechanical integrators 52, 53, 61, 62, 63, 64, 70 and 72 of well-known type, each consisting of a rotary disc on which a friction wheel on a carriage is radially positioned on the disc, and the integral of speed and radius is represented by the rotational output of the friction wheel, which is taken off of a rotary spline on the friction wheel by a pinion. The rotary input of the discs of two of these integrators 52 and 53 is provided by the propeller 50 of the torpedo through the mechanical drive 51 and represents the distance along the trajectory of the torpedo, S.

The radial positions of the wheels of integrators 52 and 53 are adjustable in accordance with the corresponding outputs of a mechanical or electrical trigonometric resolver 55. The electrical resolver may consist of a stator having two windings in space quadrature and a rotor having two windings in space quadrature positioned in the joint field of the stator windings so as to develop voltages proportional to its angle of adjustment and the field. If the stator windings are energized with a radius quantity the voltages induced in the rotor windings are respectively proportional to the sine and the cosine of the angle of adjustment of the rotor. The detailed construction of an electrical trigonometric resolver is disclosed in Patent No. 2,467,646, issued April 19, 1949. The now well-known mechanical resolver is represented here by its vector triangle 55.

Resolver 55 has a fixed radius input, and its angle input $\beta$ is received from shaft 80. $\beta$ is the angle between the direction of motion of the torpedo and the line of sight, and is determined in a manner to be described. The output of resolver 55 supplied as radial input to integrator 52 is sin $\beta$, whereas the output of resolver 55 supplied by connection 57 as radial input to the integrator 53 is cos $\beta$. With the input S from 51, the output 54 of integrator 52 is the quantity $$\int_0^S dS \sin \beta$$

Likewise, the output from integrator 53 is shown at 56 and is the integration $$\int_0^S dS \cos \beta$$

Output 54 of integrator 52 is fed into mechanical differential gear 58 and output 56 is fed into mechanical differential 59, the other inputs to which are the outputs of integrators 61 and 62, respectively, whose speed input to their discs is provided by the power clock 60 which also spins integrator discs 63 and 64, as shown. The radial position of the carriage of integrator 61 is controlled by the hand-crank input 65 and is equal to the factor $s'_o$, the component of own ship's speed perpendicular to the line of sight LOS, and the output of integrator 61 accordingly is integrated value $s'_o T$ as input to differential 58.

Likewise, the control for the carriage of integrator 62 at 66 is the quantity $s''_o$, the component of attack ship's own speed in the line of sight, LOS and the integration $s''_o T$ output thereof is supplied as input to differential 59.

Similarly, the control for the carriage of integrator 63 at 67 is $$\frac{d\theta}{dt}$$

the angular rate of change of the relative co-target angle $\theta$, and the resulting output $$\frac{d\theta}{dt}T$$

is supplied by connection 73 as input to the carriage of integrator 70. The control for the carriage of integrator 64 at 68 is the quantity $$\frac{d\theta}{dt}\tan\theta$$

and the resulting integration $$\left(\frac{d\theta}{dt}\tan\theta\right)T$$

is supplied by an input connection 75 to the carriage of integrator 72.

The input quantity $s'_0 T$ from integrator 61, combined in differential 58 with input $$\int_0^s dS\sin\beta$$

from integrator 52 is fed as quantity 71 to the disc of integrator 72, whose carriage, controlled at 75 from integrator 64, produces on shaft 76 the quantity $$\left(\frac{d\theta}{dt}\tan\theta\right)T\left(\int_0^s dS\sin\beta+s'_0 T\right)$$

and this quantity is combined in differential 77 with a by-pass along shaft 71' from shaft 71, resulting in the quantity $$1+\left(\frac{d\theta}{dt}\tan\theta\right)T\left(\int_0^s dS\sin\beta+s'_0 T\right)$$

of Formula 12 above.

Similarly, the quantity $s''_0 T$ fed into differential 59 with the output 56 from integrator 53, produces output 69 to disc 70 whose carriage is controlled by output 73 from integrator 63, thus giving the integration 74 which is $$\frac{d\theta}{dt}T\left(\int_0^s dS\cos\beta+s''_0 T\right)$$

This quantity on shaft 74 is combined with that on shaft 78 in differential 79 to produce on shaft 80 the complex equivalent of angle $\beta$ according to the above formulae. This angle value $\beta$ is then fed to the resolver 55 as described, thus completing the mechanical circuit. This angle $\beta$ is also fed along shaft 81 to differential 82 where it is combined with the control angle from the torpedo gyroscope 84, and the output of differential 82 operates the torpedo rudder 83, as indicated.

Operation of the torpedo-aiming system, described above, may be summarized as follows: Bearing in mind that the torpedo gyroscope provides a base line from which all angles may be measured, the relative co-target angle $\theta$ is related directly to it when measured according to the attack ship gyroscope, since both gyroscope angles are the same. But, since the target 11 and own ship 10 are moving relatively to each other, the relative co-target angle $\theta$ is continuously changing, at a determinable rate, so that assuming that the target 11 course and speed remain the same during the time of flight of the torpedo, the rate of change of the relative co-target angle $\theta$ is determined from the relative speed of the target and attack ship.

Since the distance travelled by the torpedo after launching is known from its propeller speed, the range need not be attempted to be accurately determined, but need be only estimated. Thus, the known or determinable input factors are speed of torpedo; component of own ship's speed in the line of sight $s''_0$; the rate of change of the relative co-target angle relative to the gyro angle, $$\frac{d\theta}{dt}$$

and time, T.

These inputs are fed to the calculating mechanism in the torpedo, shown schematically in FIG. 2, before it is launched and thereupon that mechanism, during torpedo flight, generates the changing angle $\beta$, whose sine and cosine functions are fed back into the system, as described. Since changing angle $\beta$, relatively to the gyro angle, is fed to the rudder 83 of the torpedo by the mechanical system after the torpedo is launched, the rudder 83 is continuously adjusted so that the torpedo is caused to describe the curved path 23, following the target 11 for each increment of change of position thereof along its course 20 during a given interval of time, until at any range within the range of the torpedo, it will hit the target 11.

Although a preferred embodiment of the torpedo-aiming system of this invention has been illustrated and described herein, it is to be understood that the invention is not limited thereby, but is susceptible of changes in form and detail within the scope of the appended claims.

I claim:

1. In an aiming system for dirigible projectiles, the combination of means on the projectile for guiding the same toward the target, actuating mechanism on the projectile operatively connected to said guiding means, calculating means on the projectile adjustable prior to flight thereof in accordance with rate of change of an angle between the line of sight from the firing station to the target and a relatively fixed base line to continuously develop a quantity corresponding to each increment of relative change of position of the target, control connections between said calculating mechanism and said actuating means for adjusting the latter in accordance with said quantity, and means interposed in said connections and jointly responsive to said calculating means and the distance travelled by the projectile for modifying the said adjustment of said actuating means, whereby the projectile is caused to guide itself in flight toward the target.

2. In an aiming system for dirigible projectiles, the combination of means on the projectile for guiding the same toward the target, actuating mechanism on the projectile operatively connected to said guiding means, a gyroscope on said projectile for establishing a relatively fixed base line, calculating means on the projectile adjustable prior to flight thereof in accordance with rate of change of an angle between the line of sight from the firing station to the target and said gyroscope-established relatively fixed base line to continuously develop a quantity corresponding to each increment of relative change of position of the target, control connections between said calculating mechanism and said actuating means for adjusting the latter in accordance with said quantity, and means interposed in said connections and jointly responsive to said calculating means and the distance travelled by the projectile for modifying the said adjustment of said actuating means, whereby the projectile is caused to guide itself in flight toward the target.

3. In an aiming system for dirigible projectiles, the combination of means on the projectile for guiding the same toward the target, actuating mechanism on the projectile operatively connected to said guiding means, a gyroscope on said projectile for establishing a relatively fixed base line, calculating means on the projectile adjustable prior to flight thereof in accordance with rate of change of an angle between the line of sight from the firing station to the target and a relatively fixed base line bearing a predetermined relation to said gyroscope-established base line to continuously develop a quantity corresponding to each increment of relative change of position of the target, control connections between said calculating mechanism and said actuating means for adjusting the latter in accordance with said quantity, and means interposed in said connections and jointly responsive to said calculating means and the distance travelled by the projectile for modifying the said adjustment of said actuating means, whereby the projectile is caused to guide itself in flight toward the target.

4. In an aiming system for dirigible projectiles, the combination of means on the projectile for guiding the same toward the target, actuating mechanism on the projectile operatively connected to said guiding means, calculating means on the projectile adjustable prior to flight thereof in accordance with rate of change of an angle between the line of sight from the firing station to the target and a relatively fixed base line to continuously develop a quantity corresponding to each increment of relative change of position of the target, means jointly responsive to said calculating means and the distance travelled by the projectile in flight for regulating said calculating means to modify said quantity, and control connections between said calculating mechanism and said actuating means for adjusting the latter in accordance with said quantity, whereby the projectile is caused to guide itself in flight toward the target.

5. In an aiming system for dirigible projectiles, the combination of means on the projectile for guiding the same toward the target, actuating mechanism on the projectile operatively connected to said guiding means, calculating means on the projectile adjustable prior to flight thereof in accordance with rate of change of an angle between the line of sight from the firing station to the target and a relatively fixed base line to continuously develop a quantity corresponding to each increment of relative change of position of the target, means on said projectile adjustable prior to flight thereof in accordance with the movement of the firing station and connected to said calculating mechanism for modifying the output thereof accordingly, control connections between said calculating mechanism and said actuating means for adjusting the latter in accordance with said quantity, and means interposed in said connections and jointly responsive to said calculating means and the distance travelled by the projectile for modifying the said adjustment of said actuating means, whereby the projectile is caused to guide itself in flight toward the target.

6. In an aiming system for dirigible projectiles, the combination of means on the projectile for guiding the same toward the target, actuating mechanism on the projectile operatively connected to said guiding means, means on said projectile responsive to the speed thereof in flight, integrating calculating means on the projectile adjustable prior to flight thereof in accordance with rate of change of an angle between the line of sight from the firing station to the target and a relatively fixed base line to continuously develop a quantity corresponding to each increment of relative change of position of the target, connections between said speed responsive means and said integrating means for adjusting the same during flight of the projectile, control connections between said calculating mechanism and said actuating means for adjusting the latter in accordance with said quantity, and second integrating means interposed in said last-named connections and jointly responsive to said first integrating means and the distance travelled by the projectile for modifying the said adjustment of said actuating means, whereby the projectile is caused to guide itself in flight toward the target.

7. In an aiming system for dirigible projectiles, the combination of means on the projectile for guiding the same toward the target, actuating mechanism on the projectile operatively connected to said guiding means, a gyroscope on said projectile for establishing a relatively fixed base line, calculating means on the projectile adjustable prior to flight thereof in accordance with rate of change of an angle between the line of sight from the firing station to the target and a relatively fixed base line to continuously develop a quantity corresponding to each increment of relative change of position of the target, means jointly responsive to said calculating means and the distance travelled by the projectile in flight for regulating said calculating means to modify said quantity, and control connections between said calculating mechanism and said actuating means for adjusting the latter in accordance with said quantity, whereby the projectile is caused to guide itself in flight toward the target.

8. In an aiming system for dirigible projectiles, the combination of means on the projectile for guiding the same toward the target, actuating mechanism on the projectile operatively connected to said guiding means, a gyroscope on said projectile for establishing a relatively fixed base line, calculating means on the projectile adjustable prior to flight thereof in accordance with rate of change of an angle between the line of sight from the firing station to the target and a relatively fixed base line to continuously develop a quantity corresponding to each increment of relative change of position of the target, means on said projectile adjustable prior to flight thereof in accordance with the movement of the firing station and connected to said calculating mechanism for modifying the output thereof accordingly, control connections between said calculating mechanism and said actuating means for adjusting the latter in accordance with said quantity, and means interposed in said connections and jointly responsive to said calculating means and the distance travelled by the projectile for modifying the said adjustment of said actuating means, whereby the projectile is caused to guide itself in flight toward the target.

9. In an aiming system for dirigible projectiles, the combination of means on the projectile for guiding the same toward the target, actuating mechanism on the projectile operatively connected to said guiding means, timing means in said projectile, integrating calculating means on the projectile adjustable prior to flight thereof in accordance with rate of change of an angle between the line of sight from the firing station to the target and a relatively fixed base line to continuously develop a quantity corresponding to each increment of relative change of position of the target, connections between said timing means and said integrating means for adjusting the same during flight of the projectile, control connection between said calculating mechanism and said actuating means for adjusting the latter in accordance with said quantity, and second integrating means interposed in said last-named connections and jointly responsive to said first integrating means and the distance travelled by the projectile for modifying the said adjustment of said actuating means, whereby the projectile is caused to guide itself in flight toward the target.

10. In an aiming system for dirigible projectiles having an external rudder for guiding the same, the combination of motive means in the projectile for actuating the rudder, calculating mechanism in the projectile for continuously developing a quantity in accordance with an angle between the line of sight from the projectile firing station to the target and a relatively fixed base line, operative connections between said calculating mechanism and said motive means for controlling said motive means, means for adjusting said calculating mechanism prior to projectile flight in accordance with the rate of change of said angle to correspondingly change said quantity during projectile flight, gyroscope means connected to said calculating mechanism in the projectile for introducing said relatively fixed base line during flight of said projectile, and means jointly responsive to said calculating mechanism and the distance travelled by said projectile during flight thereof for controlling said mechanism to modify said quantity, whereby the projectile is caused to guide itself in flight toward the target.

11. In an aiming system for dirigible projectiles having an external rudder for guiding the same, the combination of motive means in the projectile for actuating the rudder, calculating mechanism in the projectile for continuously developing a quantity in accordance with an angle between the line of sight from the projectile firing station to the target and a relatively fixed base line, operative connections between said calculating mechanism and said motive means for controlling said motive means, means for adjusting said calculating mechanism prior to projectile flight in accordance with the rate of change of the angle, said angle to correspondingly change said quantity during projectile flight, means for further adjusting said calculating mechanism in accordance with the speed of the firing station, gyroscope means connected to said calculating mechanism in the projectile for introducing said relatively fixed base line during flight of said projectile, and means jointly responsive to said calculating mechanism and the distance travelled by said projectile during flight thereof for controlling said mechanism to modify said quantity, whereby the projectile is caused to guide itself in flight toward the target.

12. In an aiming system for dirigible projectiles having an external rudder for guiding the same, the combination of motive means in the projectile for actuating the rudder, integrating means in the projectile having a member driven at a uniform rate and a cooperating input member, means for adjusting said input member prior to flight of said projectile in accordance with the rate of change of an angle between the line of sight to the target and a relatively fixed base line to develop a correspondingly changing angle, operative connections between the output of said integrating means and said motive means for controlling the rudder, second integrating means in said projectile having cooperating input members, means responsive to the speed of said projectile in flight for driving one of the input members of said second integrating means, connections between the output of said first integrating means and the other of said last-named input members, and operative connections between the output of said second integrating means and said motive means for regulating the adjustment of the rudder in accordance with changes in speed of the projectile, whereby the projectile describes a curved path toward the target according substantially with change of said corresponding changing angle.

13. In an aiming system for dirigible projectiles having an external rudder for guiding the same, the combination of motive means in the projectile for actuating the rudder, integrating means in the projectile having a member driven at a uniform rate and a cooperating input member, means for adjusting said input member prior to flight of said projectile in accordance with the rate of change of an angle between the line of sight to the target and a relatively fixed base line to develop a correspondingly changing angle, operative connections between the output of said integrating means and said motive means for controlling the rudder, second integrating means in said projectile having cooperating input members, means responsive to the speed of said projectile in flight for driving one of the input members of said second integrating means, trigonometric calculating means in said projectile connected to the output of said first calculating means for developing a function of said corresponding changing angle, operative connections between the output of said calculating means and the other of said input member of said second integrating means, means jointly connected to the output of said integrating means for combining the same, and operative connections between said last-named means and said motive means for regulating the adjustment of the rudder to cause the projectile to describe a curved path toward the target.

14. In a control system for a torpedo having a rudder for guiding the same, the combination of calculating mechanism in the torpedo, means for adjusting said mechanism prior to launching said torpedo in accordance with the rate of change of the angle between the line of sight to the target and a relatively fixed base line $$\left(\frac{d\theta}{dt}\right)$$

means for adjusting said calculating mechanism prior to launching said torpedo in accordance with the speed of the launching vessel in the line of sight to the target ($s''_o$), means for adjusting said calculating mechanism prior to launching said torpedo in accordance with the speed of the launching vessel normal to the line of sight to the target ($s'_o$), means in the torpedo responsive to speed thereof in flight for regulating said mechanism, whereby the changing angle $\beta$ is developed by said calculating mechanism in accordance with the formula $$\frac{d\theta}{dt}T\left[\int_0^s \cos\beta dS + s''_o T\right]$$
$$= \left[1 + \frac{d\theta}{dt}(\tan\theta)T\right]\left[\int_0^s \sin\beta dS + s'_o T\right]$$

described in the annexed specification, and operative connections between said calculating mechanism and said rudder for guiding said torpedo on a curved path toward the said target.

References Cited in the file of this patent
UNITED STATES PATENTS

| | | |
|---|---|---|
| 1,581,147 | Whitaker | Apr. 20, 1926 |
| 2,363,363 | Rubissow | Nov. 21, 1944 |
| 2,380,425 | Frische et al. | July 31, 1945 |